(12) United States Patent
Laleg

(10) Patent No.: US 7,074,845 B2
(45) Date of Patent: Jul. 11, 2006

(54) SWOLLEN STARCH-LATEX COMPOSITIONS FOR USE IN PAPERMAKING

(75) Inventor: Makhlouf Laleg, Pointe-Claire (CA)

(73) Assignee: Pulp and Paper Research Institute of Canada, Quebec (CA)

(*) Notice: Subject to any disclaimer, the term of this patent is extended or adjusted under 35 U.S.C. 154(b) by 198 days.

(21) Appl. No.: 10/407,163

(22) Filed: Apr. 7, 2003

(65) Prior Publication Data

US 2003/0188738 A1 Oct. 9, 2003

Related U.S. Application Data

(60) Provisional application No. 60/370,696, filed on Apr. 9, 2002.

(51) Int. Cl.
*C08L 3/00* (2006.01)

(52) U.S. Cl. ............. 524/47; 162/164.1; 524/13; 524/35; 524/300; 524/447; 524/492

(58) Field of Classification Search .......... 162/164.1; 524/13, 14, 35, 36, 37, 47, 300, 447, 492, 524/493

See application file for complete search history.

(56) References Cited

U.S. PATENT DOCUMENTS

| 4,104,213 | A |   | 8/1978  | Chiang et al.              |
|-----------|---|---|---------|----------------------------|
| 4,277,529 | A | * | 7/1981  | Friedman ............ 428/211.1 |
| 4,750,974 | A | * | 6/1988  | Johnson ............. 162/164.1 |
| 4,959,125 | A | * | 9/1990  | Spendel ............. 162/158   |
| 5,439,558 | A |   | 8/1995  | Bergmann et al.            |
| 6,117,525 | A | * | 9/2000  | Trokhan et al. ....... 428/154 |
| 6,416,624 | B1| * | 7/2002  | Nielsen et al. ....... 162/155 |

FOREIGN PATENT DOCUMENTS

EP  0 924 341 A1  6/1999
WO  WO 97/11226  3/1997

* cited by examiner

*Primary Examiner*—James J. Seidleck
*Assistant Examiner*—U. K. Rajguru
(74) *Attorney, Agent, or Firm*—Ogilvy Renault LLP

(57) ABSTRACT

A novel filler treatment comprising the preparation of swollen starch-latex compositions, prepared in the presence or absence of co-additives, and the addition of the said composition to a filler suspension, has been developed. Use of the treated filler during papermaking improves filler retention and produces filled papers where addition of the filler has only a minimal negative effect on strength properties. The swollen starch-latex compositions can be prepared in a batch or jet cooker, or by mixing with hot water under controlled conditions (i.e., temperature, pH, mixing, mixing time) in order to make the starch granules swell sufficiently to improve their properties as a filler additive but avoiding excess swelling leading to their rupture. The swollen starch-latex composition is then rapidly mixed with the filler slurry, preferably in a static mixer, and added to the papermaking furnish at a point prior to the headbox of the paper machine. The starch-latex composition can be used with wood-free or wood-containing furnishes. The treated filler is easily retained in the web during papermaking, improves drainage, and gives sheets having good formation. Sheets made with the treated fillers have higher bonding and tensile strengths than sheets produced using filler treated with either swollen starch alone or latex alone. Retention and drainage are further improved when conventional retention aid chemicals are added to the furnish containing the treated filler. The use of swollen starch-latex compositions could allow the papermaker to increase the filler content of the paper without sacrificing dry strength properties or increasing the amount, and hence the cost, of the retention aid added. The combination of swollen starch and latex could be used as furnish additives in the manufacture of both filled grades and grades that contain no filler such as sack papers and paperboard products.

15 Claims, 4 Drawing Sheets

US 7,074,845 B2

SWOLLEN STARCH-LATEX COMPOSITIONS FOR USE IN PAPERMAKING

CROSS-REFERENCE TO RELATED APPLICATIONS

This application is related to U.S. Provisional Application Ser. No. 60/370,696 Apr. 9, 2002 and the benefit under 35 USC 119(e) of such U.S. Provisional Application is claimed.

BACKGROUND OF THE INVENTION a) Field of the Invention

This invention relates to filler treatment with swollen starch-latex compositions, prepared in the presence or absence of co-additives, for use in the manufacture of filled wood-free and wood-containing paper grades. The invention also relates to combinations of swollen starch and latex for use as furnish additives in grades that contain no filler such as sack papers and paperboard products.

b) Description of Prior Art

In the manufacture of filled papers the filler slurry is added to the pulp suspension before it is transferred to the forming section of the paper machine. A retention aid or retention aid system comprising several components, is always added to the pulp/filler suspension (also known as the furnish) to retain as much of the filler as possible in the sheet. Adding filler to paper provides the papermaker with numerous improvements in sheet properties, including improved opacity, brightness, feel, and print definition. Furthermore, when the filler is cheaper than the pulp, addition of filler to the sheet results in cost savings due to the replacement of the fibre by filler. These savings can be substantial when low cost fillers, such as precipitated calcium carbonate (PCC), are used to replace expensive chemical pulp fibres. Moreover, filled paper is much easier to dry than paper with no filler and, as a result, the papermachine can run faster with less steam consumption, which reduces costs and improves productivity. Therefore, the addition of high levels of PCC to the sheet would drastically reduce the cost of fine paper manufacture.

However, for a given sheet weight there are limits to the amount of filler that can be added. The strength of paper is usually the most important factor limiting the filler content, although other factors such as retention, drainage, and the chemical demand for retention and sizing are also a consideration.

Making paper with a high filler content requires an efficient retention aid system. It is required that the retention aid gives good filler retention under the high shear and turbulence levels found in the papermachine and that it improve drainage, but without impairing formation. The retention aid chemicals are added to the papermaking furnish, at a point prior to or at the inlet of the headbox of the paper machine. The retention aids are composed of single or dual chemical additives that improve filler and fines retention by a bridging and/or flocculation mechanism. The chemicals help attach the filler particles and fines (small fibrous fragments) to the long fibres or cause their aggregation into larger flocculated particles which are more easily retained in the web. In order to create the attachment and flocculation the chemicals must adsorb on the surfaces of the fillers, fines and fibres. The degree of adsorption of chemicals and the attachment forces are influenced by many things including furnish cleanliness and furnish chemistry, the properties of the added chemicals, the level of shear in the papermaking process and the contact time between the retention aids and the furnish components.

Paper strength is inevitably reduced by replacement of the fibres by filler; not only because there are less fibres in the sheet which reduces the number of fibre-fibre bonds in the sheet, but also because the presence of the filler reduces the area of contact between the remaining fibres. Filler particles do not bond between themselves and their location at the fibre-fibre bonded area prevents hydrogen bonding from occurring between the pulp fibres. As a result, retaining high amounts of filler produces a weaker sheet that can break more easily on the paper machine, size press, coater, winders and printing presses. Weaker fibre-fibre bonding also decreases the surface strength of the paper, causing a reduction in pick resistance and an increase in linting. Poor bonding of filler particles in the fibrous structure can also increase dusting in the pressroom.

In general, all common inorganic fillers, (for example, clay, ground calcium carbonate (GCC), PCC, chalk, talc, titanium dioxide, precipitated calcium sulphate, are known to impair strength and increase demand for chemicals. In particular, fillers with high surface areas, such as scalenohedral PCC which is widely used in the manufacture of fine papers, have excessive negative effects on strength and increase the chemical demand of additives used for strength, sizing and retention. Due to its shape, narrow particle size distribution, and high surface area, PCC has a tendency to reduce bonding in the sheet more than other common papermaking fillers, such as chalk, GCC and clay, and also gives the sheet an open structure which makes the sheet excessively permeable or porous. High sheet porosity is detrimental for print quality and liquid absorbency. As the content of PCC is increased in the furnish the demand for sizing chemicals, such as alkyl ketene dimer (AKD) and alkenyl succinic anhydride (ASA) is increased to maintain the desired degree of sizing or water repellence. This is because a disproportionate fraction of the sizing chemical is adsorbed on the high surface area PCC. Poor sizing efficiency and loss of water repellence over time (size reversion) are common problems associated with the use of PCC in highly-filled wood free papers sized with AKD and ASA. In recent years many paper mills making wood-containing grades have converted to neutral papermaking to allow use of bright calcium carbonate fillers, such as GCC and PCC, and major concerns with the use of PCC in these grades remains retention, sheet strength and printing operations.

An ongoing industry trend is to decrease sheet grammage to reduce costs. Unfortunately, as the grammage is decreased nearly all paper properties deteriorate, including the limiting factors of opacity, bending stiffness and permeability. Reduction in grammage may also decrease retention of filler during papermaking and increase the frequency of sheet breaks both on the paper machine and during converting and printing. To overcome the loss in sheet opacity the papermaker can add more of the high opacity fillers, but this in turn can cause further deterioration in sheet strength. The industry needs cost-efficient technology for the production of the lightweight grades with good filler retention and drainage and acceptable strength, formation, optical, and printing characteristics.

Water-soluble natural and synthetic polymers are commonly used for strength development in the manufacture of filled and unfilled paper grades. Starch is the oldest and most widely used additive for increasing the strength of paper. In order to increase strength the starch macromolecules must adsorb on the long fibres and reinforce the fibre-fibre bonded areas. Cationic and amphoteric starches are added to the paper machine wet-end in the production of coated and uncoated wood-free fine papers, bleached paperboards, and many filled- and unfilled-grades. Since starch is inexpensive compared to synthetic polymers its dosage level can be as high as 40 kg per ton or more. Cationic starch is also used in the preparation of dispersions of AKD, ASA and rosin sizes, and as a retention aid in combination with a silica micro-particle such as anionic colloidal silicic acid. The cationic starch or cationic starch-size dispersions are usually easily adsorbed on the negatively-charged fibres and fines and are retained in the sheet during the forming process. Unfortunately, when cationic starch is used in chemical pulp furnishes the improvement in the strength of the paper is often low and addition of higher levels of starch does not improve strength. This phenomenon is related to the limited amount of starch that can adsorb on the fibres. It appears once the negative charge on the fibre surfaces is neutralised by the cationic charge of the starch macromolecules, no further starch adsorbs, even at high dosage rates. With mechanical pulp furnishes the starch performance is usually reduced by the high levels of fibre fines and anionic colloidal solids. The anionic colloidal solids, also known as anionic trash or dissolved and colloidal substances (DCS), can neutralise a large portion of the cationic charge on the starch making it ineffective for improving fibre-fibre bonding. The application of starch in the manufacture of filled wood-free and some wood-containing grades is often limited to a maximum of 4 to 10 kg/ton of paper. At higher dosage rates the starch may impair drainage and other sheet qualities, such as formation, porosity and brightness, and the improvements in tensile strength are usually small. At present, there are no cost-efficient polymers capable of developing adequate strength when added to furnishes containing high levels of fines and DCS such as found in mechanical pulp furnishes.

Cationic starch is normally used as a papermaking additive after being fully cooked. Generally, the starch powder is dispersed in cold water at about 2%–6% concentration then cooked or gelatinized either in batch cookers at 96° C.–100° C. for a period of about half an hour or in jet-cookers at 120–140° C. for a few minutes. These cooking processes lead to complete gelatinization of the starch granules followed by their dissolution into amylose and amylopectin macromolecules. In special applications, such as in the manufacture of heavy paperboard products, the dispersed starch granules are also applied directly to the formed sheet by spraying the uncooked starch slurry onto the moist web. The gelatinisation of the starch granules is believed to take place during the drying operation of the sheet. An improvement in the starch cooking process for use in the manufacture of paper was disclosed more than forty years ago in U.S. Pat. No. 2,805,966, which describes the cooking of the starch slurry in a steam injection cooker. This was said to permit control of the heating so that the majority of the starch granules were swollen but not ruptured. Two other methods to produce a swollen starch whose granules do not disintegrate during agitation were disclosed in U.S. Pat. No. 2,113,034 and U.S. Pat. No. 2,328,537. In U.S. Pat. No. 2,113,034 this was accomplished by reaction of the starch with formaldehyde. In U.S. Pat. No. 2,328,537 this was accomplished by reaction of starch with certain antimony or phosphorous chlorides or oxychlorides. The patents suggest that the products might be useful in manufacture of paper. However, since the products have limited swelling characteristics even in hot water and are only partially retained in the paper sheet they never found acceptance in the paper manufacturing industry. U.S. Pat. No. 5,620,510 also discloses a method for preparation of a swollen starch for use as a dry strength additive in the papermaking process. In this invention the swollen granules of starch were produced under controlled conditions of temperature and pH that prevent their disintegration during agitation. An alternative method of producing swollen modified starch for increasing strength of paper was disclosed in patent WO 97/46591. The modified starch is prepared by a process comprising the step of swelling a cationised cross-linked starch under conditions selected so that a cross-linking agent, sodium trimetaphosphate, maintains the viscosity of the swollen product at a level less than 400 cps. The washed swollen product is to be added to the paper furnish, at or prior to the headbox of the paper machine. The swollen starches of all the above patents were proposed for addition to a paper machine pulp furnish.

It has been common knowledge in the paper industry that the addition of an anionic latex to a papermaking furnish, combined with alum (aluminum chloride), causes the latex to precipitate and thereby give increased strength to paperboard. A number of patents, particularly U.S. Pat. No. 4,178,205, U.S. Pat. No. 4,189,345, and U.S. Pat. No. 4,187,142, disclose the general idea that a cationic latex can be added to the papermaking furnish. Because of the anionic nature of the pulp furnish, cationic latex adsorbs easily on pulp surfaces and provide additional fibre-fibre bonding and tensile strength to the paper product. These patents relate primarily to so-called "high-strength" papers, which are largely made without addition of fillers. The furnishes of these paper grades contain many other additives including starch, size, alum, and retention aids. Therefore, the strengthening benefits from the addition of latex might be attributed to its interaction with these additives. In own laboratory handsheet studies on pulp suspensions containing no other additives, it has been found that at equal dosage levels the cationic latices are about 10 times less efficient than a cooked cationic starch in increasing strength. For example, an addition level of 1% cationic starch, on pulp, produced a greater internal bond strength and tensile strength than the dosage of 10% cationic latex, despite the large amount of latex being retained in the sheet. Similar low strength results were also obtained when anionic latices were added to pulp suspensions where the fibres have previously been made cationic to promote latex adsorption.

Another approach for improving filler retention, strength and sizing performance is by treating the filler suspension with additives prior to mixing with the pulp stock. For example, several patents including U.S. Pat. No. 4,225,383, U.S. Pat. No. 4,115,187, U.S. Pat. No. 4,445,970, U.S. Pat. No. 5,514,212, GB Patent 2,016,498, U.S. Pat. No. 4,710,270, and GB Patent 1,505,641 describe the benefits of filler treatment with additives on retention and sheet properties. It is known that since most common inorganic filler particles in suspension carry a negative charge, the cationic additive adsorbs on their surfaces by electrostatic interactions causing their agglomeration or flocculation. For anionic additives to promote flocculation the filler particles would require a positive charge to allow adsorption of the anionic additive. The flocculation of the filler particles usually improves retention during sheet making and also increases sheet strength, but excessive flocculation of filler can also decrease the gain in optical properties expected from the filler addition. GB Patent 2,016,498 discloses flocculating fillers with a composition comprising cooked starch, an organic polyelectrolyte, and an agent for controlling the degree of flocculation and viscosity of dispersion. The resulting pre-flocculated filler is disclosed to provide improved tensile strength in filled paper. U.S. Pat. No. 4,710,270 discloses pre-flocculated filler particles covered with a dispersion of cationic starch and carboxymethylcellulose or alginate, resulting in improved strength and retention.

GB Patent 1,505,641 discloses treating calcium carbonate filler with anionic styrene-butadiene latex. Pre-treatment of calcium carbonate filler, especially chalk whiting, with this latex is used to produce protected filler particles, which are then added in papermaking to improve the strength of the filled sheet. This patent also discloses that the calcium carbonate filler has a positive zeta-potential, produced by a pre-treatment of the filler with a small amount of a fully cooked cationic starch. The filler particles are made cationic by the addition of the starch with the objective to promote the adsorption of the anionic latex on the surfaces of filler particles. The latex-treated filler suspension, containing up to 20 parts of latex per 100 parts of chalk, is added before the headbox of the paper machine, for example, to the beater or pulper, and has a smaller negative effect on strength compared to untreated filler. Similarly, U.S. Pat. No. 4,445,970 discloses a method of manufacturing paper containing a mixture of clay and talc fillers and anionic latex to promote strength. The latex is preferably added to the machine chest, most preferably in amounts ranging between 3 and 7% based on the dry furnish.

At no point do any of the above patents disclose that the starch can be swollen in the presence of latex, either anionic or cationic, with or without the use of co-additives, for enhancing bridging between the swollen starch granules and the latex. Also, there are no references or claims related to the combination of swollen starch and latex in filler treatment for use in the manufacture of paper or as additives to the furnish used in papermaking.

SUMMARY OF THE INVENTION

It is an object of this invention to provide a composition for use in papermaking.

It is another object of the invention to provide a filler suspension for use in papermaking.

It is yet another object of the invention to provide a pulp furnish for papermaking.

It is still another object of the invention to provide a process for providing a filler suspenson for papermaking.

Yet another object of the invention is to provide a method of making paper.

Still another object of the invention is to provide a novel paper.

In accordance with one aspect of the invention, there is provided a composition for use in papermaking comprising swollen starch granules and a latex in an aqueous vehicle In accordance with another aspect of the invention, there is provided a filler suspension for use in papermaking comprising: filler particles, swollen starch granules and a latex, in an aqueous vehicle.

In accordance with yet another aspect of the invention, there is provided a pulp furnish for papermaking comprising: pulp fibres, filler particles, swollen starch granules and a latex, in an aqueous vehicle.

In accordance with still another aspect of the invention, there is provided a process for producing a filler suspension for papermaking comprising contacting particulate filler with swollen starch and a latex, in an aqueous vehicle.

In accordance with yet another aspect of the invention, there is provided a process of making paper comprising: a) forming an aqueous papermaking furnish comprising pulp fibers, filler particles, swollen starch granules and a latex, in an aqueous vehicle, b) draining the furnish through a screen to form a sheet, and c) drying the sheet.

In accordance with still another aspect of the invention, there is provided a paper comprising a matrix of pulp fibres and filler particles, a retention system for said filler derived from the solids content of swollen starch granules and a latex.

DETAILED DESCRIPTION

In one embodiment of the invention there is provided a filler suspension for use with pulp fibres in papermaking, comprising filler particles in a liquid vehicle, typically aqueous, and a swollen starch and latex in said vehicle; the suspension may also contain co-additives for the starch and latex, and papermaking agents.

In another embodiment of the invention, there is provided a composition for treating fillers in papermaking, comprising a swollen starch and latex; the composition may also contain co-additives for the starch and latex, and papermaking agents.

In another embodiment of the invention, there is provided a paper furnish comprising, in an aqueous furnish vehicle, pulp fibres, filler particles, a swollen starch and latex; the furnish may also contain co-additives for the starch and latex, and papermaking agents.

In still another embodiment of the invention, there is provided a method of producing paper by adding a filler suspension comprising filler particles, a swollen starch and latexin a liquid vehicle, to a pulp fibre stock to form a paper furnish, and producing paper from the furnish. Anionic and cationic agents can be added to the furnish containing the treated filler to enhance retention and improve drainage. The furnish may also contain co-additives for the starch and latex, and papermaking agents.

The invention also provides processes for producing swollen starch-latex compositions and their introduction to the filler suspensions.

The swollen starch-latex composition, in the presence or absence of co-additives, is suitably prepared in batch or jet cookers or by mixing the suspension of starch and latex with hot water. For a given starch, the swelling is done under controlled conditions of temperature, pH, mixing and mixing time, in order to avoid rupture of the swollen starch granules. The composition is rapidly added to the filler suspension, which is then introduced to the paper furnish, at a point prior to or at the headbox of the paper machine. During the drying operation the retained swollen starch granules with filler particles will rupture, thereby liberating amylopectin and amylose macromolecules to bond the solid components of the sheet.

The combination of swollen starch and latex can be used in filler treatments and in papermaking under acid, neutral or alkaline environments. The compositions are for use in filler treatments such that the treated filler is well retained in the sheet and has a minimum negative influence upon sheet strength. Using the swollen starch-latex compositions for filler treatment, with or without co-additives, gives greater retention and strength benefits than the use of the swollen starch alone or latex alone, or the standard approach of adding fully cooked starch. It was also found that adding swollen starch to the filler slurry followed by addition of latex produces useful treated filler suspensions for use in the manufacture of filled papers. The combination of swollen starch and latex was also found useful for use as an additive to filled or unfilled furnishes for strength development.

When the filler is treated with a swollen starch-latex composition, made with or without co-additives, of this invention and added to a pulp slurry, the filler particles agglomerate and the agglomerated filler particles adsorb on the surfaces of the fines and fibres causing their rapid flocculation in the furnish. This results in good retention of the filler and fines and improves web drainage even without the addition of a retention aid. However, under high levels of shear, turbulence and vacuum, filler retention can be reduced due to deflocculation and detachment of the filler from the fibre surfaces. Adding an anionic micro-particle, such as colloidal silicic acid, to the papermaking furnish containing the treated filler, at or prior to the headbox, and preferably to the pressure screen of paper machine, substantially enhanced retention and drainage.

It was surprising to find that the addition of latex to uncooked starch, followed by partial cooking at temperatures slightly below the gel point to produce swollen starch was a better additive system than adding either swollen starch alone or latex alone.

It has been found that making the filler particles cationic by treating them with water-soluble cationic polymers, including cooked cationic starch, polyethylenimine, polydadmac or polyvinylamine helped the adsorption of anionic latex on their surfaces. However, the improvements in strength of filled paper were significantly lower than those achieved in the present invention using the swollen starch-latex compositions. The preparation of swollen starch-latex compositions or cooked starch-latex complexes, either for use in filler treatment prior to being added to pulp suspension in the manufacture of filled papers or for use as pulp stock additives in the manufacture of paper and paperboard grades that contain no filler, has not been previously disclosed.

a) Fillers

The fillers in accordance with this invention are typically inorganic materials having an average particle size ranging from 0.5 to 30 μm, more usually 1 to 10 microns, such as common papermaking fillers like clay, ground calcium carbonate (GCC), chalk, precipitated calcium carbonate (PCC), talc, and precipitated calcium sulphate (PCS) and their blends. The papermaking pulp slurry to which the treated filler is to be added, in accordance with this invention, can be composed of mechanical pulp, chemical pulp or recycled pulp and their mixtures.

While the filler generally may comprise particles having sizes in the general range of 0.5 to 30 μm, generally the particles will fall within the lower size range of 1 to 10 microns, and the filler particles are generally significantly smaller than the swollen starch granules.

b) Swollen Starch Granules

Starches suitable for use in this invention include starch originating from corn, waxy corn, potato, wheat, tapioca, sorghum, waxy sorghum, rice. The starch can be cationic (positively-charged), anionic (negatively-charged), amphoteric (a combination of positive and negative charges), converted, or unmodified. The average particular size of most unswollen granules range between 5 and 35 μm.

Starch granules are insoluble in cold water because of their organized hydrogen-bonded structure. To disperse or "cook" starch, it is necessary to introduce enough energy to disrupt hydrogen bonding and to introduce molecules of water. When aqueous suspensions of starch are heated, the granules pass first through a stage of slight, reversible swelling until a critical temperature is reached. At this temperature, known as the pasting or gelatinization temperature, the granular structure "melts". Massive swelling occurs, which causes a large increase in viscosity. Beyond this stage the viscosity decreases again due to the rupture of the swollen granules. Each variety of starch has a different pasting temperature range. Swollen starch granules used in the invention are distinct from cooked starch. Cooked starch results when swollen starch granules disrupt above the gelatinization point of the starch, whereafter the formal amylose and amylopectin dissolve in aqueous medium.

Depending on the starch source, the particle size of the swollen starch granules range between 5 μm and 90 μm or higher. The best performance is obtained when the swollen starch granules are carefully controlled to prevent their rupture. The preferred range of the granules is such that 80% of the swollen particles are within the range of 30 to 70 μm.

c) Latex

An important aspect of the present invention is the use of a suitable latex. The latex can be anionic, cationic or amphoteric.

Suitable latices include acrylic latex, cationic styrene/butylacrylate dispersion. Carboxylated styrene/butadiene dispersion, polyvinylacetate dispersion, cationic styrene/butadiene dispersion, n-butyl acrylate-acrylonitrile-styrene copolymer. The average particle size of latexes may range between 800 to 1300 nm.

d) Swollen Starch-latex Composition

The swollen starch granules and the latex interact such that the granules become carriers for the latex. In particular, anionic chemical groups, for example carboxy groups on the latex particles, may interact with the cationic sites on swollen starch granules to bind latex particles to the granules. The latex particlesmay be absorbed on the swollen granules.

In general, the compositions comprise 60 to 95%, by weight of the granules and 40 to 5%, by weight of latex, to a total of 100%, by weight, based on the total solids content of the granules and latex. The preparations of starch and latex in the composition depend on the filler to be treated and the grade of paper to be produced.

It will be understood that the composition will contain complexes of latex bound to swollen starch granules, as well as free swollen starch granules and free latex particles.

The composition of swollen starch granules and latex is suitably employed in an amount of 1 to 10%, by weight, as dry solids, based on the weight of filler particles.

e) Co-additives

The compositions of the invention may optionally include co-additives for the swollen starch granules and latex, which co-additives enhance the effectiveness of the composition of starch granules and latex. Typically, the co-additives are anionic, for example carboxymethylcellulose, polyacrylic acid, alginate, colloidal silicic acid, bentonite polyacrylamide and soluble soap, or cationic, for example polyethylene imine, chitosan, polyvinylamine, poly (dadmac), alum, trivalence and tetravalence cations.

In general, where a co-additive is employed, it is present in an amount of 1% to 10%, by weight, suitably 0.5% to 5%, by weight, based on the total solids weight of the swollen starch granules and latex.

f) Papermaking Agents

The compositions, suspensions and furnishes of the invention may additionally include conventional papermaking agents, for example sizing agents such as alkylketene dimmer, alkenyl succinic anhydride and rosin; wet strength agents, and cationic or anionic polymeric retention aids. The composition may include a retention aid which may be a single chemical, such as an anionic micro-particle (colloidal silicic acid, bentonite), anionic polyacrylamide, a cationic polymer (cationic polyacrylamide, cationic starch), or dual chemical systems (cationic polymer/anionic micro-particle, cationic polymer/anionic polymer). The choice of retention aid chemicals and their addition points in the paper machine approach system will depend on the nature of the ionic charge of the treated filler slurry and the papermaking furnish.

g) Components of Composition

The choice of preferred starch, latex, and optional co-additives, for the preparation of the swollen starch-latex compositions, and their addition to the filler slurry depends on the nature of the ionic charge of the starch and latex used as well as the nature of the surface charge of the filler to be treated. For example, with a cationic starch it is preferable to use an anionic latex whereas with an anionic or amphoteric starch it is preferable to use a cationic latex. When cationic latex is used with cationic starch following the treatment of the filler, an anionic polymer such as OMC, polyacrylate or alginate or an anionic microparticle such as silica or bentonite, can be added to promote bridging between the filler particles and the formation of microflocs. If anionic latex is to be used with an anionic or amphoteric starch then a cationic agent such as those described above, is needed to form a complex and promote bridging between the treated filler particles.

In order to achieve the best combination of starch, latex and optional co-additives for a filler treatment it is important to consider the nature of charges of starch and latex as well as the nature of charge of the filler to be treated. For a cationic starch or an amphoteric starch, depending of the charge of the latex (anionic or cationic) the co-additive may be cationic or anionic.

In general, the treated filler particles of the invention comprising the filler particles in the swollen starch granules and the latex are employed in an amount of 5% to 60%, as dry solids, based on the dry weight of pulp in furnish.

It was found that handsheets made with PCC or clay fillers treated with the swollen starch-latex compositions, even at a filler content of 40%, had greater internal bond strength, as measured by the Scott bond technique, than a control sheet made with no filler. At equal filler content the tensile properties and air resistance of sheets made with the treated filler were all improved and were much greater than those sheets made with the untreated filler.

The use of the swollen starch and latex combinations of this invention permits the production of filled papers, such as coated and uncoated fine papers, super-calendered papers, and newsprint, with minimal strength loss, improved air resistance and good optical properties. The fillers treated according to the invention can thus allow papermakers producing filled papers to raise the filler content of the sheet without sacrificing dry strength properties or increasing the cost of the retention aid. In general, the potential benefits from the use of the treated filler suspensions of the present invention include improved retention, drainage, strength, opacity and print quality, and reduced usage of expensive reinforcement chemical pulp fibre and the usage of retention aid.

Under certain conditions the combination of swollen starch and latex may also be used to efficiently strengthen other grades that contain no filler such as, sack papers and paperboard products.

Particular methods in accordance with the invention include the treatment of fillers with the additive systems containing swollen starch, latex. And co-additives. The starch granules in a starch slurry at 2–10% solids and room temperature may be swollen at temperatures below the starch gel point in a batch cooker, a jet cooker or by mixing with hot water. The preferred method of this invention is to swell the granules by mixing the starch slurry prepared in cold water with hot water. The temperature of hot water used depends on the consistency of the initial starch slurry in cold water, the temperature of cold water pH, and residence time to produce the swollen granules. The values of temperature and reaction time for preparing the swollen starch-latex composition would depend on the type of starch used, the pH of the starch slurry and heating time 1) A starch dispersion mixed with latex in cold water is swelled, then the swollen starch-latex composition is added to an agitated filler suspension. In this method, the starch powder is first dispersed in cold water then latex is incorporated into the dispersion under shear. The starch-latex mixture mixed with hot water or is heated at a temperature below the starch gel point for a few minutes. The swollen starch-latex composition is then rapidly mixed with the filler suspension, usually at room temperature, at consistencies between 10–60%, more preferably between 20%–40%.

2) A starch dispersion is first swelled, then added to an agitated filler suspension followed by the introduction of latex. In this method, the starch powder is dispersed in cold water then mixed with hot water or heated at a temperature below the starch gel point. The swollen starch is then rapidly mixed with the filler suspension, usually at room temperature, at consistencies between 10–60%, more preferably between 20%–40%, followed by the addition of latex.

The above two polymeric compositions and filler treatment methods were prepared under good mixing conditions. Anionic agents or cationic agents can be added during the preparations of swollen starch-latex compositions to form the complex or to the sheared treated filler suspension to develop bridged filler particles. By using the right mixing equipment, these treatment strategies can produce homogeneous filler suspensions, which are stable during storage for a long period. The viscosity of PCC slurry at a constant concentration, prior to and after treatment with swollen starch and latex, measured over a wide range of shear, tends to be lower than that of untreated PCC slurry. The size of the agregated filler particles can be controlled by the shear forces applied.

The treated filler suspensions can be directly introduced to the pulp slurry or diluted, if needed, and added to the paper machine pulp stock prior to the sheet forming process, i.e., at the blend chest, machine chest, or inlet of the fan pump. The introduction of the treated filler to the pulp suspension induces flocculation of the pulp slurry. The degree of flocculation is, however, influenced by the level of shear and residence time. In general, the treated-filler suspensions tended to retain their flocculation characteristics over time when added to papermaking pulp slurries. To enhance filler retention an anionic micro-particle, such as silica, an anionic polymer such as CMC, or a conventional polymeric retention aid such as polyarylamide, can be added to furnish (comprising the pulp and treated filler), preferably at a point prior to or at the headbox or pressure screen. Upon addition of silica or CMC, to the pulp stock containing the treated filler, the retention and drainage substantially improved.

Microscopy analysis indicates that the filler particles in the form of small aggregates are well distributed in the sheet. The bond strength, tensile properties and air resistance of sheets made with the treated filler were all improved and much greater than those of sheets made with the untreated filler. The treated filler also improved the sheet optical properties. It was also found that an increase in the proportion of latex in the swollen starch-latex compositions used in the treatment of filler dispersions further improved the strength properties of the filled sheet.

DETAILED DESCRIPTION OF THE DRAWINGS

Figure 1:
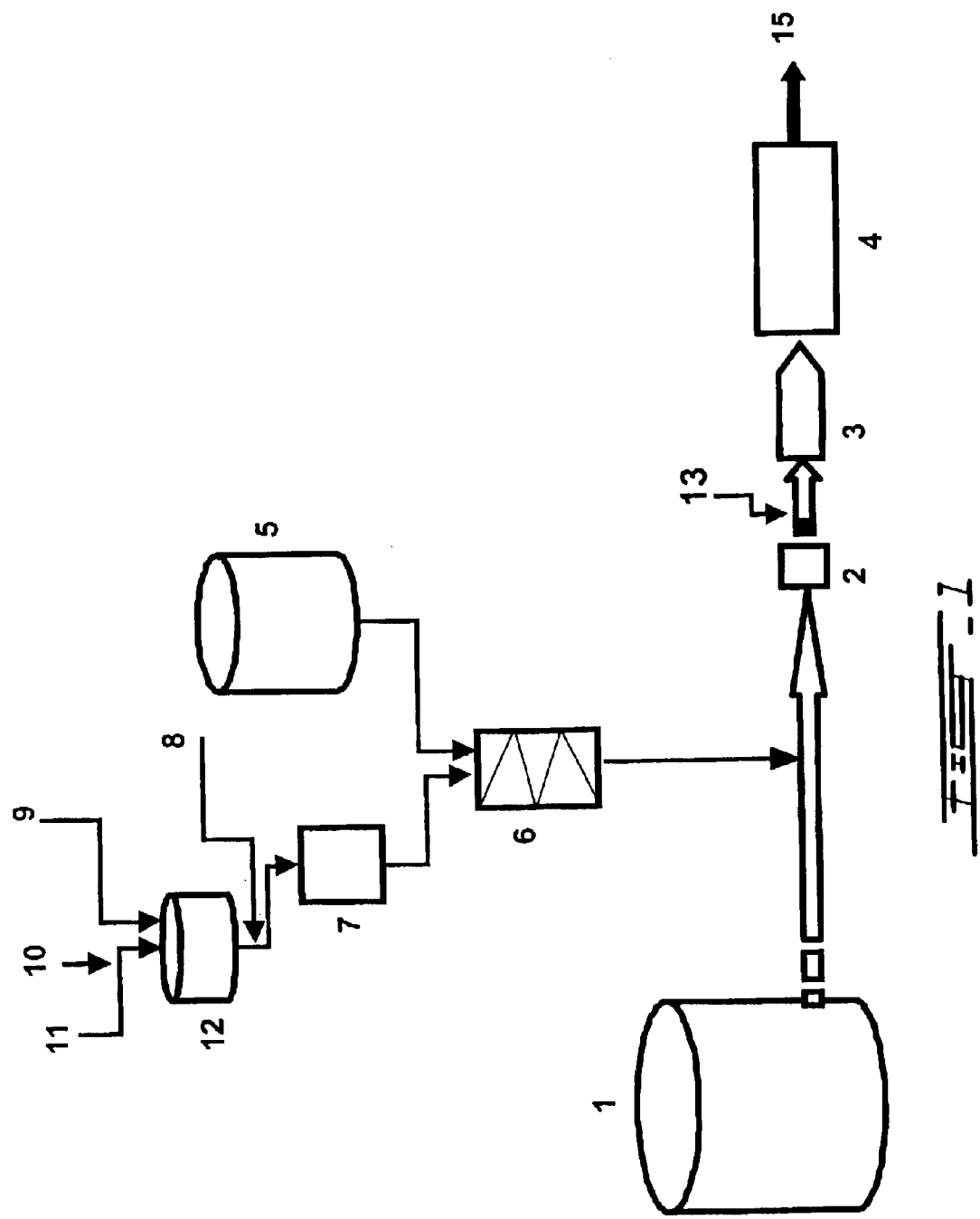
FIGS. 1 and 2 illustrate schematically processes for preparation of the compositions containing swollen starch granules and latex, with and without co-additives, and for making the treated filler suspension of the present invention and its addition to the paper machine pulp stock.

FIG. 1: 1) pulp stock, 2) fan pump, 3) headbox, 4) forming, pressing and drying sections, 5) filler stock, 6) mixer, pump 8) latex, 9) co-additive, 10) cold water, 11) starch powder, 12) mixing tank, 13) retention aid, 14) paper. Mixing can be done by mechanical agitation with an impeller or by a centrifugal pump.

In the process of FIG. 1, cold water 10 and starch provider 11 are fed to mixing tank 12, and co-additive 9 is added to mixing tank 12. These components are mixed in mixing tank 12 and the resulting mixture is fed, with the addition of latex 8 to mixer 7 for further mixing and swelling. The resulting mixture and filler stock 5 are fed to mixer 6 to produce a treated filler suspension. The filler suspension is added to a pulp from pulp stock 1 and pumped to pump 2 in a pumped flow to headbox 3. A retention aid 13 is added to the pumped flow. The pulp furnish from headbox 3 is fed to the forming, pressing and drying sections 4 of a paper machine from which is received paper 14.

Figure 2:
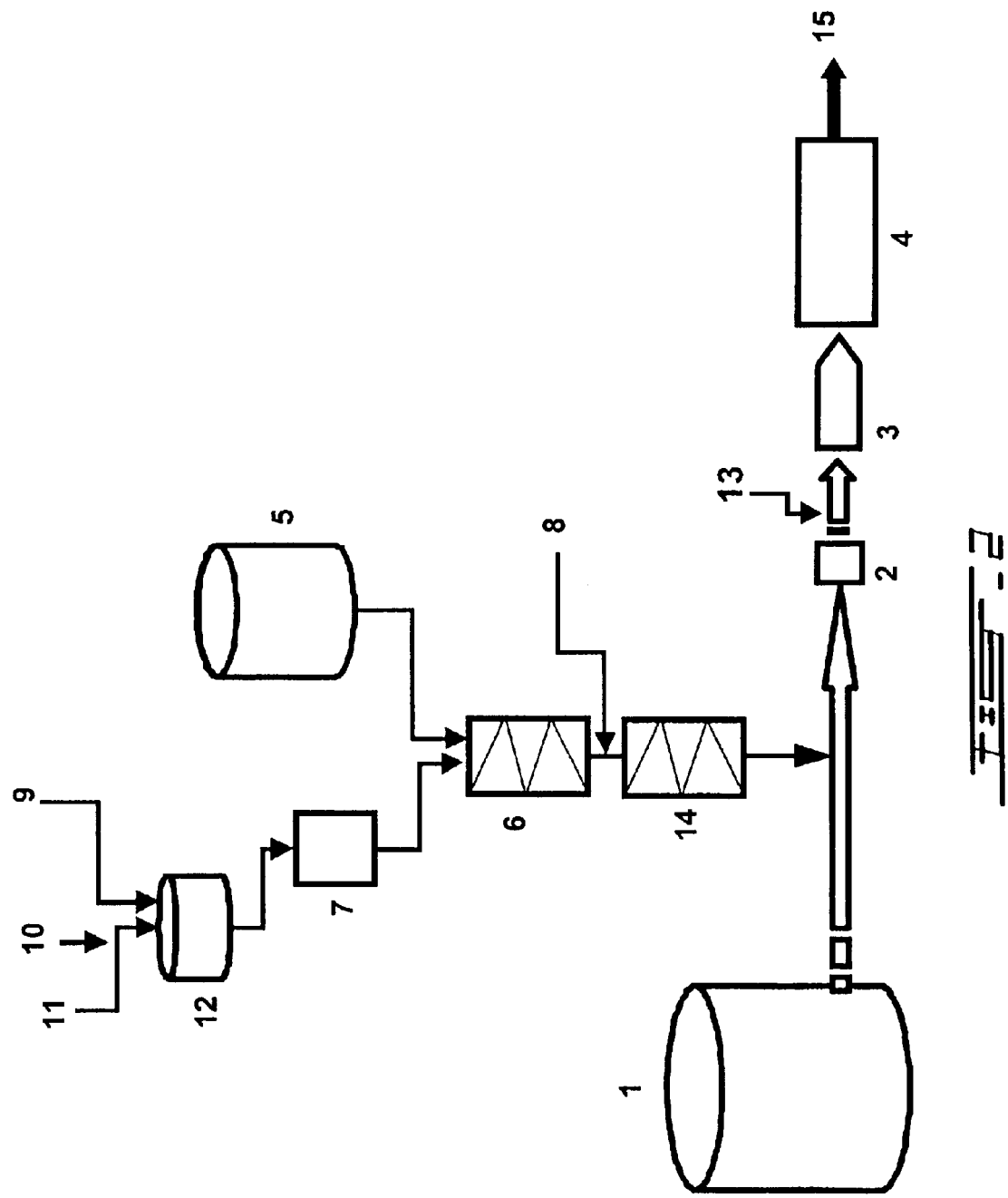

FIG. 2: 1) pulp stock, 2) fan pump, 3) headbox, 4) forming, pressing and drying sections, 5) filler stock, 6) mixer, 7) mixer, 8) latex, 9) co-additive, 10) cold water, 11) starch powder, 12) mixing tank, 13) retention aid, 14) paper.

Figure 3:
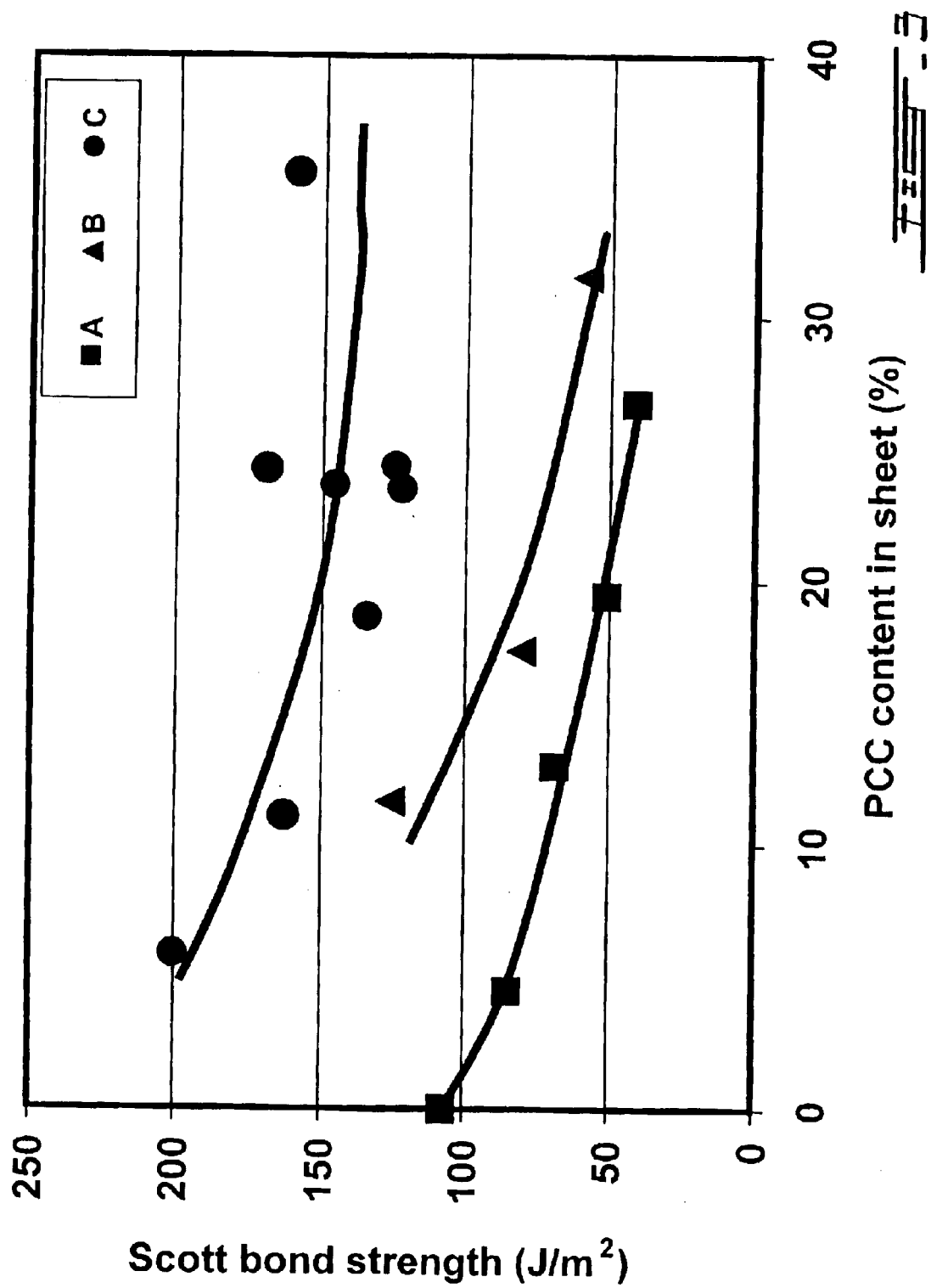
FIGS. 3 and 4 show the internal bond strength (Scott bond) i.e. SBS($J/m^2$) and breaking length i.e. BL (km) of sheets filled with PCC i.e. PCC % which is the PCC content in the sheets using the conventional process and the process of the invention.
Figure 4:
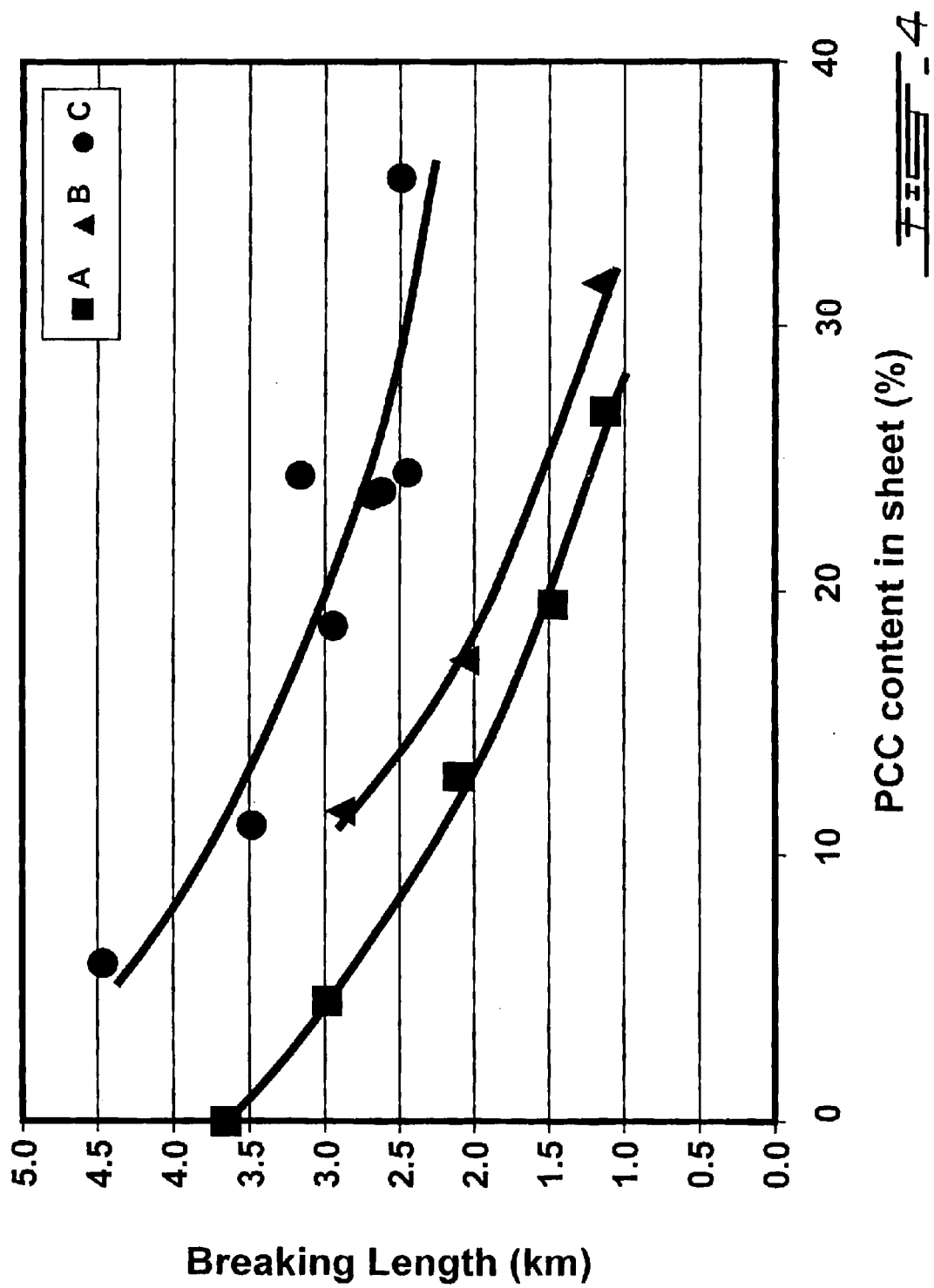

The process of FIG. 2 is similar to that of FIG. 1 except that the co-additive 8 is added to the filler suspension from mixer 6 and is mixed with the filler suspension FIGS. 3 and 4: A) sheets filled with PCC without polymer addition, B) sheets filled with PCC with addition of 1.5% starch to furnish (pulp+PCC)–conventional process, C) sheets filled with PCC treated in accordance with the invention (swollen starch/latex/co-additive).

EXAMPLES

The method of this invention can be best described and understood by the following illustrative examples. In the examples, the results were obtained using laboratory scale techniques. The basic procedure consisted of adding an amount of the treated filler suspension to a pulp slurry under mixing prior to a retention test and sheet making. The filler retention test was done using a dynamic retention/drainage jar (also called the Britt Jar) at room temperature. For the Britt Jar retention test, the consistency of the furnish (pulp/filler) was 0.5%, by weight, and the speed of the propeller in the jar was 750 rpm. The paper sheets (60 $g/m^2$) were prepared at 50° C. using a dynamic sheet machine. They were prepared from agitated pulp suspensions containing untreated or treated PCC. The PCC has an average particle size of 1.6 µm which was obtained from Specialty Minerals Inc. Immediately before sheet making the furnish was diluted in the sheet machine deckle from 1% to 0.1% under shear. The formed moist webs were pressed on a laboratory roll press to about 40% solids and dried on a photographic dryer. Prior to physical testing, the dried sheets were conditioned in a room at 50% RH and 22° C. for 24 hours.

In the following examples the treated filler suspensions were prepared as follows. A 2% dispersion of cationic waxy maize starch powder (Cato 232 trade-mark, from National Starch and Chemical Corporation) was prepared in cold water then a portion of anionic acrylic copolymer latex (Acronal S866 trade-mark, from BASF) or cationic styrene butylacrylate co-polymer latex (Latex 8675, from BASF) was incorporated into the dispersion under gentle agitation. The homogeneous starch-latex mixture was then agitated in a heated water bath. When the temperature of the starch-latex mixture attained 65° C., the mixing was allowed to continue for few minutes. After this period the swollen starch-latex blend was rapidly added to the cold filler slurry at 20% solids under mixing with an impeller. Another treated filler suspension was also prepared under the same conditions, except that the cationic waxy maize starch powder was added to a 0.1% CMC solution. The CMC used in the examples was a technical grade obtained from Aldrich. Its average molecular weight was 700,000 and degree of substitution was 0.9. The mixture of swollen starch-CMC-latex was then added to the filler slurry at 20% solids under mixing with an impeller. The fillers of the above two treatments were then added to 1% pulp suspensions under mixing prior to carrying out the retention test and handsheet making. In some tests, anionic micro-particle silica (Eka NP890, from Eka Nobel) was added to the sheared furnish during the retention test and handsheet making. The silica allowed the production of a micro-flocculated furnish and improved retention and formation. Some filler samples were treated with swollen starch alone or latex alone and used to make filled sheets for comparison.

Three pulps were used in the following examples. One was a peroxide-bleached thermo-mechanical pulp (BTMP). Another was collected from a mixed stock of a paper machine producing fine paper and was composed of bleached hardwood kraft pulp (BHKP), bleached softwood kraft pulp (BSKP) and recycled pulp. This pulp had a Canadian Standard Freeness (CSF) of 540 mL CSF. The third pulp stock was prepared in the laboratory from 80% BHKP and 20% BSKP and had a freeness of 560 mL CSF. The pH was 5.5 for all furnishes containing clay filler and 7.0 and 8.3 for BTMP and fine paper furnishes, respectively, blended with precipitated calcium carbonate filler.

Example 1

PCC retention results were obtained in the Britt jar at 750 rpm, using PCC treated with different polymeric combinations. Furnishes at 0.5% solids were prepared by mixing PCC treated with swollen cationic starch (Cato 232), made in the absence and presence of CMC and latex, with BTMP suspensions at 50° C. and under shear. The amount of treated PCC in the furnish was 40%. At the same dosage levels the retention of PCC was low (i.e., less than 30%) when the PCC was treated with swollen starch, anionic latex (Acronal S866) or cationic latex (Latex 8675). The PCC retention ranged between 75 and 80% when the PCC was treated with swollen starch-latex compositions made with or without co-additive CMC. It was over 90% when the filler treated with swollen starch-latex compositions, prepared in the presence or absence of CMC, was added to pulp suspension then followed by addition of anionic silica (0.1 to 0.2% based on furnish). Similar retention results were obtained with kaolin clay. Similar high PCC retention values were also measured when the PCC treated with swollen starch-latex, in absence or presence of CMC, was added to fine paper furnishes followed by addition of silica. A Very high retention was also achieved when the silica was replaced by CMC.

Example 2

Table 1 presents the properties of 60 $g/m^2$ BTMP sheets made with and without PCC (treated and untreated) at pH 7.0. The sheet were all calendered under the same conditions (80 kN/m and 50 ° C.). The treatment of PCC had no detrimental effect on sheet opacity. The content of PCC in the 60 g/m² sheets varied between 23 and 39%. The sheets made with the addition of untreated PCC (27% in sheet) have higher air permeability (more open sheet) and have lower internal bond strength (Scott bond) and burst strength. The treatment of PCC with swollen cationic starch-latex compositions, in the presence or absence of CMC, reduced the air permeability of the sheet and substantially improved the Scott bond strength and burst strength. The treatment of PCC with the swollen cationic starch-anionic latex compositions increased the bond strength of the filled sheet even at high filler content. A less permeable sheet is more desirable because of reduced absorbency of liquids in ink, coating and sizing applications. However, a common problem associated with the aggregation of filler particles is a reduction in the light scattering power leading to reduced sheet opacity. The opacity of sheets made with untreated PCC or treated PCC are quite similar, suggesting that the treatment did not significantly impaired the light scattering power of PCC. Similar trend results were obtained when PCC was replaced by kaolin clay fillers.

TABLE 1

BTMP sheet. Calendered at 50° C. and 80 kN/m.

| Addition conditions | PCC in sheet, % | Internal bond strength, J/m² | Burst index kPa · m²/g | Gurley AR (s/100 mL) | Opacity, % |
|---|---|---|---|---|---|
| No PCC | 0 | 150 | 1.76 | 114 | 86 |
| Non treated PCC | 27 | 100 | 0.99 | 82 | 92 |
|  | 39 | 78 | 0.75 | 58 | 92 |
| PCC treated with 10% CS/2.5% AL | 34 | 215 | 1.18 | 107 | 92 |
| PCC treated with 10% CS/5% AL | 33 | 238 | 1.38 | 129 | 92 |
| PCC treated with 10% CS/0.1% CMC/2.5% AL | 36 | 242 | 1.34 | 165 | 91 |

PCC: precipitated calcium carbonate,
CS: swollen cationic starch,
AL: anionic latex.
Except when indicated otherwise, amounts in % are to be understood as % by weight.

Example 3

Table 2 presents the properties of wood-free sheets made with and without addition of 25% PCC (treated and untreated) to a pulp furnish #1 (collected from a mixed stock of a paper machine producing fine paper) at pH 8.3. The treatment of PCC with the swollen cationic starch followed by anionic latex substantially improved the bonding strength and tensile properties. The sheets having 20% PCC have greater bonding strength then the sheets made without PCC (control sample). The treatment of PCC with the blend has small negative effect on the gain in brightness and opacity due to a small reduction in the light scattering coefficient of the filler.

TABLE 2

Fine paper sheets - mill pulp furnish #1

| Properties | No PCC | Non treatment | 5% CS on PCC | 5% CS/1% AL on PCC | 5% CS/5% AL on PCC |
|---|---|---|---|---|---|
| PCC content in sheet, % | 0 | 20.9 | 19.1 | 20.0 | 24.3 |
| Internal bond strength, J/m² | 225 | 91 | 145 | 203 | 243 |
| Breaking length, km | 4.71 | 2.08 | 2.64 | 3.17 | 3.37 |
| Stretch, % | 3.37 | 1.42 | 2.09 | 2.43 | 2.76 |
| Opacity, % | 74.5 | 85.0 | 85.5 | 84.8 | 81.4 |
| Brightness, % | 89.3 | 92.0 | 90.1 | 89.9 | 89.7 |

PCC: precipitated calcium carbonate,
CS: swollen cationic starch,
AL: anionic latex,

Example 4

Table 3 presents the properties of wood-free sheets made with and without addition of 25% treated PCC to a pulp furnish #2 (collected from a mixed stock of a paper machine producing fine paper) at pH 8.3. The PCC was treated with swollen cationic starch (CS) alone and three mixtures of CS/AL at 90%/10%, 75%/25%, and 50%/50%. The total dosage level of CS, or CS/AL mixtures was 10% on PCC based on dry weight. The treatment of PCC with the swollen cationic starch alone improved the bonding strength and tensile properties. However, the treatment of PCC with a combination of CS and AL substantially improved these properties, the strength properties were much higher than those sheets made with CS alone. The best strength improvement was achieved with PCC treated with a mixture composed of 75% CS and 25% AL. The 60 g/m$^2$ sheets made with 20% PCC treated with the three CS/AL compositions their ISO opacity is 85%, and have greater bonding strength and tensile properties than the sheet made without PCC (control sample with ISO opacity 72%). The sheets made with treated PCC have higher tear resistance than sheets made with untreated PCC. The treatment of PCC with swollen CS alone made the sheet more permeable, whereas the sheets made with PCC treated using swollen CS/AL tend to become less permeable as the amount of latex in the mixture increases.

(75%) and AL (25%), in the absence and presence of 0.125% CMC. The total dosage level of the CS/AL/CMC mixture was 10% on PCC based on dry weight. FIGS. 3 and 4 show that the introduction of PCC to fine paper sheets without addition of strength polymers substantially reduced the internal bond strength (Scott bond) and the breaking length. The addition of 1.5% (15 kg/ton) of cooked starch to furnish containing PCC (conventional process) only slightly improved these properties. The treatment of PCC with the swollen CS/AL/CMC improved these strength properties better than the treatment of PCC with CS/AL. For sheets containing 19.5% untreated PCC their Scott bond strength was reduced by 52% compared to unfilled sheets and the breaking length dropped by 60%. The sheets made with 23.7% PCC treated with swollen CS/AL mixture had Scott bond strengths that were 36% greater and their breaking length dropped by only 31%. The treatment of PCC with combination of CS/AL/CMC substantially improved these properties, even at high filler content (FIGS. 3 and 4). For example, the sheets made with 24.3% PCC treated with swollen CS/AL/CMC mixture had Scott bond strengths that were 58% greater and their breaking length dropped by only 13%. The sheets made with 35.6% PCC treated with swollen CS/AL/CMC mixture had Scott bond strength that were 49% greater and their breaking length dropped by only 29%. Therefore, using our invention it was possible to produce

TABLE 3

| | Fine paper sheets - mill pulp furnish #2 | | | | | | |
|---|---|---|---|---|---|---|---|
| Additions conditions | PCC in sheet, % | Internal bond strength, J/m$^2$ | B.L., km | Stretch, % | Tear index, mNm2/g | Brightness, % | Opacity, % |
| No PCC | 0 | 309 | 5.65 | 3.52 | 6.64 | 90.8 | 72.3 |
| PCC treated with CS only | 19.9 | 212 | 2.69 | 1.69 | 5.52 | 92.1 | 85.8 |
| PCC treated with CS/AL (90/10) | 17.3 | 355 | 4.00 | 3.15 | 5.51 | 91.7 | 84.3 |
| PCC treated with CS/AL (75/25) | 20.8 | 413 | 4.59 | 3.52 | 5.61 | 91.3 | 84.4 |
| PCC treated with CS/AL (50/50) | 20.8 | 364 | 4.05 | 3.59 | 5.6 | 91.1 | 85.5 |

PCC: precipitated calcium carbonate,
CS: cationic starch,
AL: anionic latex.
B.L.: breaking length.

Example 5

Table 4 presents the properties of wood-free sheets made with and without addition of 20 to 40% PCC to a pulp furnish (made in the laboratory) at pH 8.3. The PCC was either untreated or treated with a mixture of swollen CS sheets containing high filler contents and with a Scott bond value greater than for the unfilled sheet and with only a small loss in tensile properties. Additionally the optical properties of the sheet were not impaired by this treatment and the permeability of the sheet was improved.

TABLE 4

Fine paper sheets - lab pulp furnish

| Addition conditions | PCC in sheet, % | Internal bond strength, J/m² | B.L., km | Stretch, % | Tear index, mNm2/g | Brightness, % | Opacity, % |
|---|---|---|---|---|---|---|---|
| No PCC | 0 | 107 | 3.65 | 1.53 | 8.77 | 88.7 | 73.94 |
| Non treated PCC | 13.0 | 69 | 2.62 | 1.10 | 5.05 | 90.4 | 84.8 |
|  | 19.5 | 51 | 1.47 | 0.76 | 3.86 | 91.2 | 84.9 |
| 1.5% cooked starch added to furnish (fibre + PCC) | 17.4 | 80 | 2.06 | 1.18 | 6.05 | 89.8 | 84.9 |
|  | 31.6 | 59 | 1.19 | 0.72 | 3.68 | 91.1 | 86.2 |
| PCC treated with CS only | 20.0 | 133 | 2.9 | 1.72 | 6.40 | 90.5 | 82.9 |
| PCC treated with swollen CS/AL (75/25) in presence of 0.125% CMC | 24.3 | 169 | 3.16 | 1.78 | 6.23 | 89.4 | 84.2 |
|  | 35.6 | 159 | 2.49 | 1.68 | 5.32 | 89.9 | 84.5 |

PCC: precipitated calcium carbonate,
CS: swollen cationic starch,
AL: anionic latex.
B.L.: breaking length.

What is claimed is:

1. A pulp furnish for papermaking comprising: pulp fibres, filler particles, and a composition of a complex of ionic, unruptured, swollen starch granules and an ionic latex, in an aqueous vehicle.

2. A pulp furnish according to claim 1, comprising said filler particles, swollen starch granules and latex in an amount of 1% to 60%, by weight, solids, based on the dry weight of pulp fibres.

3. A pulp furnish according to claim 2, comprising wherein said filler particles are inorganic papermaking filler particles having a size of 1 to 10 microns, and said swollen starch granules have a size of 5 to 90 microns; said starch granules and latex being present in an amount of 1 to 10%, by weight solids, based on the weight of filler, and comprising 60 to 95%, by weight of said granules and 40 to 5%, by weight of latex, to a total of 100%, by weight, based on the total solids content of said granules and latex.

4. A pulp furnish according to claim 2, wherein said latex has chemical groups, absorbed on said granules; arid said granules are of a cationic starch and said latex, is anionic or cationic.

5. A pulp furnish according to claim 2, wherein said latex has chemical groups, absorbed on said granules; and said granules are of a anionic or amphoteric starch and said latex is cationic or anionic.

6. A pulp furnish according to claim 3, wherein said latex has chemical groups which interact with said granules.

7. A pulp furnish according to claim 6, wherein said chemical groups are carboxy groups, cationic groups or amphoteric groups.

8. A pulp furnish according to claim 1, wherein said swollen starch granules have a size of 5 to 90 μm.

9. A pulp furnish according to claim 1, wherein said granules are of an cationic starch and said latex is anionic.

10. A pulp furnish according to claim 1, wherein said starch granules are of an anionic amphoteric starch and latex is cationic or anionic.

11. A pulp furnish according to claim 1, comprising 60 to 95%, by weight of said granules and 40 to 5%, by weight of latex, to a total of 100%, by weight, based on the total solids content of said granules and latex.

12. A pulp furnish according to clam 11, further including 0.5 to 5%, by weight, of a co-additive, based on the total solids content of said starch granules and latex, said co-additive being selected from the group consisting of cationic agents and anionic agents.

13. A pulp furnish according to claim 12, wherein said co-additive is an anionic agent selected from the group consisting of carboxymethyl cellulose, polyacrylic acid, alginate, colloidal silicic acid, bentonite and polyacrylamide.

14. A pulp furnish according to claim 12, wherein said co-additive is a cationic agent selected from the group consisting of chitosan, polyvinylamine, polyethyleneimine and poly(dadmac), and alum.

15. A pulp furnish according to claim 1, further including a papermaking additive selected from the group consisting of sizing agents and wet strength agents.

* * * * *